(12) United States Patent
Ding

(10) Patent No.: US 9,229,485 B2
(45) Date of Patent: Jan. 5, 2016

(54) ELECTRONIC DEVICE AND METHOD FOR SWITCHING STATE THEREOF

(71) Applicants:Beijing Lenovo Software Ltd., Haidian District, Beijing (CN); Lenovo (Beijing) Co., Ltd., Beijing (CN)

(72) Inventor: Xuedong Ding, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 293 days.

(21) Appl. No.: 13/929,292

(22) Filed: Jun. 27, 2013

(65) Prior Publication Data

US 2014/0002978 A1   Jan. 2, 2014

(30) Foreign Application Priority Data

Jun. 29, 2012   (CN) .......................... 2012 1 0227004

(51) Int. Cl.
*G06F 1/16* (2006.01)
*G06F 1/32* (2006.01)

(52) U.S. Cl.
CPC ............ *G06F 1/1667* (2013.01); *G06F 1/1616* (2013.01); *G06F 1/1624* (2013.01); *G06F 1/1626* (2013.01); *G06F 1/1643* (2013.01); *G06F 1/1669* (2013.01); *G06F 1/1677* (2013.01); *G06F 1/3271* (2013.01); *Y02B 60/1257* (2013.01)

(58) Field of Classification Search
CPC ... G06F 1/1616; G06F 1/1662; G06F 1/1667; G06F 1/1669

USPC ....................................................... 361/679.41
See application file for complete search history.

(56) References Cited

U.S. PATENT DOCUMENTS

| | | | |
|---|---|---|---|
| 4,980,676 A * | 12/1990 | Nomura et al. ............ 361/679.2 |
| 5,717,565 A * | 2/1998 | Raasch ..................... 361/679.36 |
| 6,483,445 B1 * | 11/2002 | England .......................... 341/22 |
| 6,626,543 B2 * | 9/2003 | Derryberry .................... 353/119 |
| 6,700,774 B2 * | 3/2004 | Chien et al. ................ 361/679.2 |
| 6,768,635 B2 * | 7/2004 | Lai et al. .................. 361/679.11 |
| 7,342,776 B1 * | 3/2008 | Chan ......................... 361/679.27 |
| 8,416,559 B2 * | 4/2013 | Agata et al. .............. 361/679.09 |
| 8,451,595 B2 * | 5/2013 | Leung et al. ............. 361/679.13 |
| 8,719,603 B2 * | 5/2014 | Belesiu et al. ................. 713/300 |
| 8,949,477 B2 * | 2/2015 | Drasnin ........................... 710/8 |
| 9,001,504 B2 * | 4/2015 | Han ......................... 361/679.27 |
| 2004/0056843 A1 * | 3/2004 | Lin et al. ....................... 345/168 |
| 2004/0108968 A1 * | 6/2004 | Finke-Anlauff ............... 345/1.1 |
| 2005/0052831 A1 * | 3/2005 | Chen .............................. 361/680 |
| 2006/0104013 A1 * | 5/2006 | Sakakibara et al. .......... 361/680 |
| 2007/0133160 A1 * | 6/2007 | Ma ................................ 361/683 |
| 2008/0144262 A1 * | 6/2008 | Lai ................................ 361/680 |

* cited by examiner

*Primary Examiner* — Anthony Q Edwards
(74) *Attorney, Agent, or Firm* — Brinks Gilson & Lione; G. Peter Nichols

(57) ABSTRACT

A method and an electronic device for switching state, relating to the field of electronic device applications, for facilitating a user carrying and using a peripheral keyboard is described. The electronic device includes a casing that includes a display unit for displaying on a first surface of the casing; an input unit being movably disposed on a second surface of the casing; according to different positional relationships between the input unit and the casing. The electronic device has at least two different operating modes: a tablet operating mode or a laptop operating mode. The device is usefully applied to a tablet type electronic device.

19 Claims, 11 Drawing Sheets

(a)

(b)

(a)

(b)

(a)

(b)

tablet operating mode

Laptop operating mode

ELECTRONIC DEVICE AND METHOD FOR SWITCHING STATE THEREOF

This application claims the benefit under 35 U.S.C. §119 (a) of Chinese Patent Application No. 201210227004.4 filed on Jun. 29, 2012, the entire contents of which is incorporated herein by reference.

BACKGROUND

The present invention relates to a field of electronic device applications, and more particularly, to a method for switching state and an electronic device.

At present, Personal Digital Assistants (PDAs for short), typically a tablet, win more and more favor of the public due to portability, of which a touch-screen electronic device is most popular. The touch-screen electronic device acquires text content inputted by a user via a virtual keyboard on the screen, but the virtual keyboard has problems such as slow typing and easy pressing on a wrong key, etc., so the user gets used to entering text through an external physical keyboard.

In general, the external physical keyboard is connected to the touch-screen electronic device in two ways, via Bluetooth or Universal Serial BUS (USB for short), and transmits the information content inputted by the user to the electronic device by means of a pulse signal or a level signal. When the user is not using the physical keyboard, the physical keyboard and the electronic device are kept separated, and when the user goes out, he need to carry the physical keyboard along with the electronic device, then it is easy to miss one of them, resulting in inconvenience for the user. In addition, as to a physical keyboard using wireless technologies such as Bluetooth or Infrared, the user need to regularly replace the batteries in the keyboard, also resulting in inconvenience for the user.

SUMMARY

Embodiments of the present invention provide a method for switching state and an electronic device, which make it convenient for the user to carry the electronic device and the physical keyboard, while avoiding inconvenience for the user caused by regular replacement of batteries in the wireless keyboard.

On the one hand, the embodiment of the present invention provides an electronic device, comprising:

A casing, including a display unit for displaying on a first surface of the casing;

An input unit;

The input unit being movably disposed on a second surface of the casing;

According to different positional relationship between the input unit and the casing, the electronic device has at least two different operating modes: a tablet operating mode or a laptop operating mode.

On the other hand, the embodiment of the present invention also provides a method for switching state, the method being applied to an electronic device which includes at least a casing and an input unit and is capable of receiving data content received by the input unit, the method comprising:

Detecting parameters of relative position change between the input unit and the casing, wherein the input unit can move relative to the casing to change its position;

Controlling an operating mode of the electronic device depending on the parameters of relative position change;

The electronic device has at least two different operating modes: a tablet operating mode or a laptop operating mode.

The method for switching state and the electronic device provided in the embodiments of the present invention enable the keyboard movably disposed on the back of the electronic device, easy for a user to carry it. Also, it is feasible to detect parameters of relative position change between the keyboard and the electronic device, and implement the functions of automatic start of data exchange of the keyboard and automatic charging of the keyboard depending on the parameters of relative position change; while reducing power consumption of the keyboard, it avoids inconvenience for the user caused by regular replacement of batteries in the keyboard.

BRIEF DESCRIPTION OF THE DRAWINGS

In order to illustrate the technical solution in the embodiments of the present invention or in the prior art more clearly, the drawings necessary for description of the embodiments or the prior art shall be briefly explained as follows. Apparently, the drawings in the following description are merely some embodiments of the present invention, from which those ordinarily skilled in the art still can obtain other drawings without inventive effort.

DETAILED DESCRIPTION

The technical solution in the embodiments of the present invention shall be clearly and completely described hereinafter in conjunction with the accompanying drawings in the embodiments of the invention. Apparently, the described embodiments are only part of but not all of the embodiments of the present invention. Based on the embodiments of the present invention, all the other embodiments that a person ordinarily skilled in the art obtains without inventive effort fall within the scope of the present invention.

Figure 1:
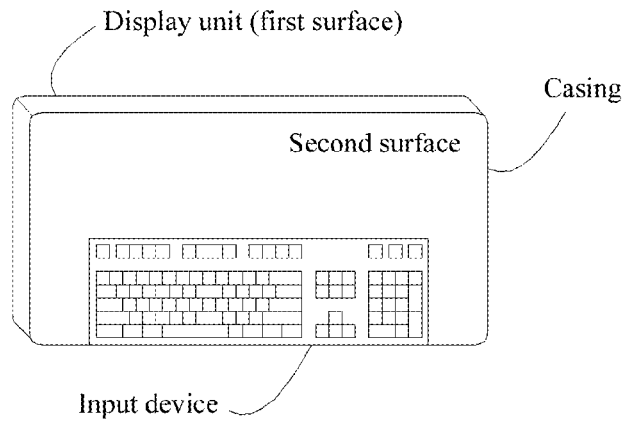
FIG. 1 shows a first type of electronic device given in the embodiments of the present invention.

The embodiment of the present invention provides an electronic device, referring to FIG. 1, the electronic device comprises a casing and an input device, wherein, The casing includes a display unit for displaying on a first surface thereof, and includes a processing unit and a storage unit inside it.

The input device can be a physical keyboard as shown in FIG. 1 or a touch-screen keyboard. The embodiments of the present invention are described by taking the physical keyboard as an example, and are not limited thereto in practical application.

The keyboard can be movably disposed on a second surface of the casing, where the second surface is the other surface opposite to the first surface of the casing.

Figure 2:
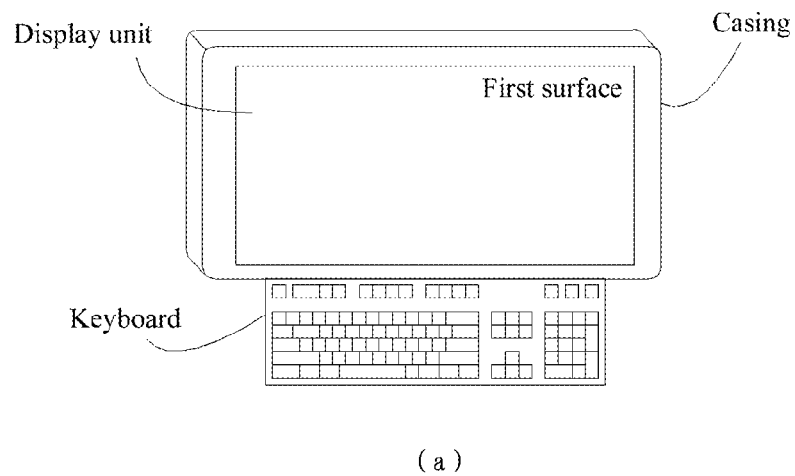
FIG. 2 shows a second type of electronic device given in the embodiments of the present invention.
Figure 2:
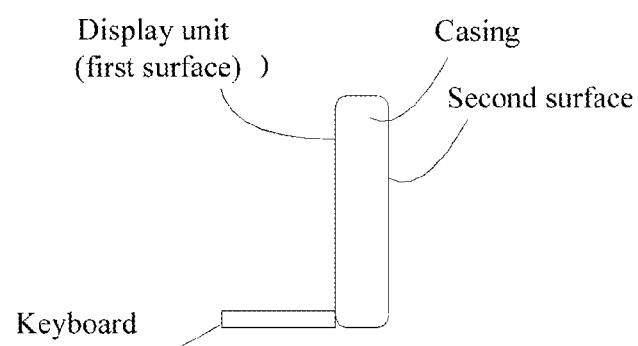

According to the relative positional relationship between the casing and the keyboard, the electronic device has at least two different operating modes: 1) a tablet operating mode (see FIG. 2(a)), 2) a laptop operating mode (see FIG. 2(b)).

The electronic device according to the embodiments of the present invention enables the keyboard movably disposed on the back of the electronic device, easy for a user to carry it.

Furthermore, as a further expansion of the electronic device as shown in FIG. 1, an electronic device as shown in FIG. 3(a) is provided in the embodiments of the present invention, a groove for accommodating the keyboard is disposed on the second surface of the electronic device. And there is a slide rail inside the groove. Referring to FIG. 3(b), in a position corresponding to slide rail on the first surface of the keyboard, there is a slide flute for connecting the slide rail, and the first surface of the keyboard is the surface with keys. The keyboard slides relative to the casing via the slide rail, and it slides out when the user wants to use it, as shown in FIG. 4; after the user has finished using the keyboard, the keyboard slides back to the groove, as shown in FIG. 5.

Figure 6:
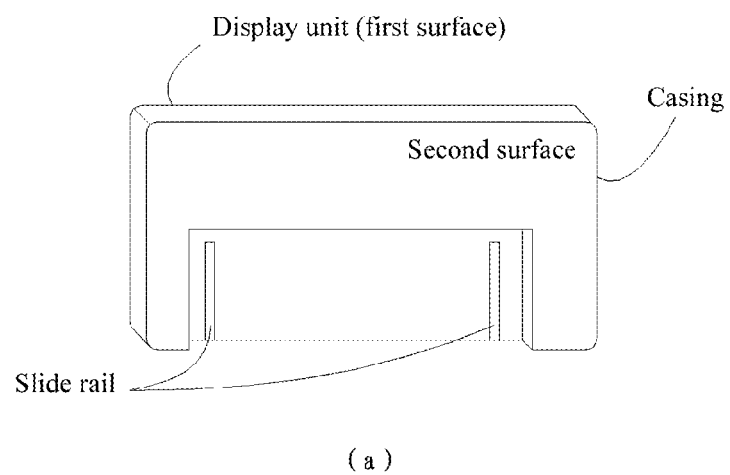
FIG. 6 shows a sixth type of electronic device given in the embodiments of the present invention.
Figure 6:
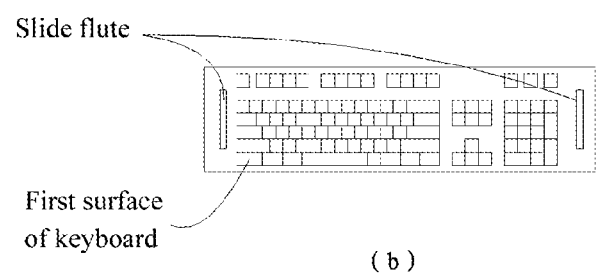

At least two slide rails can further be set in the groove, and an equal number of slide flutes are set on positions corresponding to the slide rails on the keyboard. For example, when there are two slide rails, the positions of the slide rails in the groove and the positions of the slide flutes on the keyboard are shown in FIG. 6(a) and FIG. 6(b) respectively.

Figure 7:
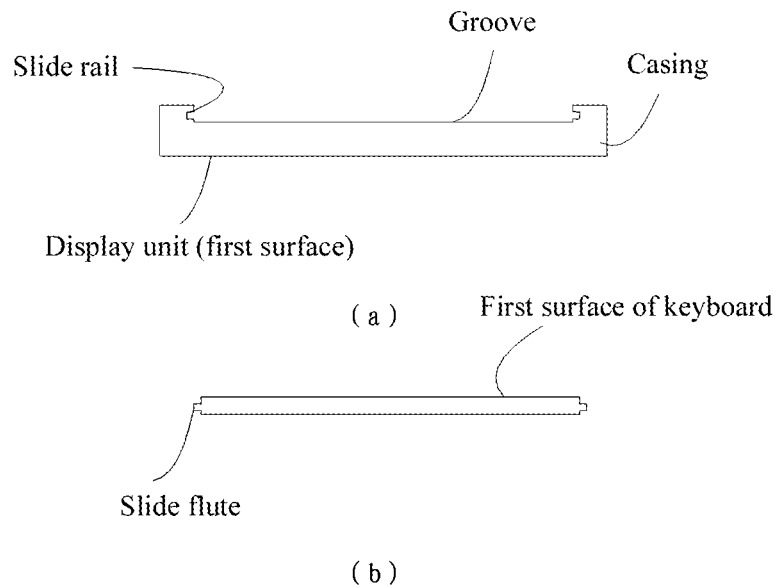
FIG. 7 shows a seventh type of electronic device given in the embodiments of the present invention.

In addition, referring to FIG. 7(a), the two slide rails can also be set on two edges of the groove respectively. Accordingly, referring to FIG. 7(b), the two slide flutes on the keyboard are set on the two sides of the keyboard respectively.

Further, the slide rails also can detect a slide-out amount of the keyboard, based on which the casing controls on and off states of the keyboard and charges the keyboard.

Figure 8:
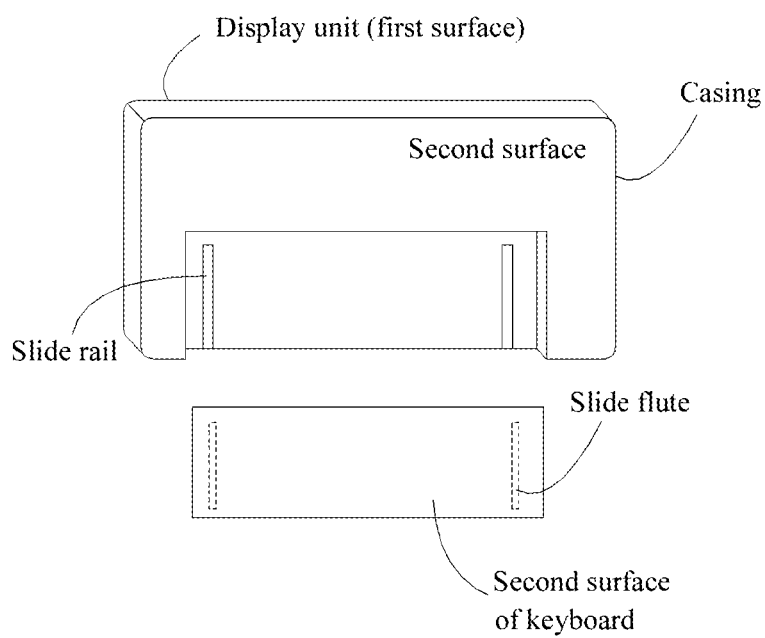
FIG. 8 shows an eighth type of electronic device given in the embodiments of the present invention.

Alternatively, referring to FIG. 8, when the keyboard is a wireless keyboard, it can slide out of the groove completely, and be independent of the casing. When the user is no longer using the keyboard, the keyboard shall slide back to the groove.

Figure 9:
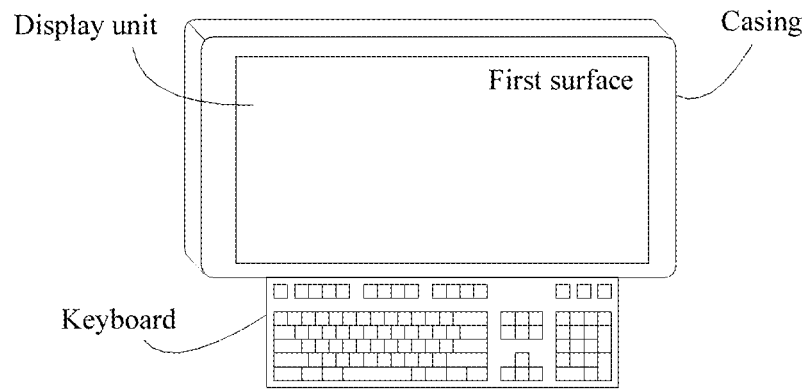
FIG. 9 shows a ninth type of electronic device given in the embodiments of the present invention.
Figure 9:
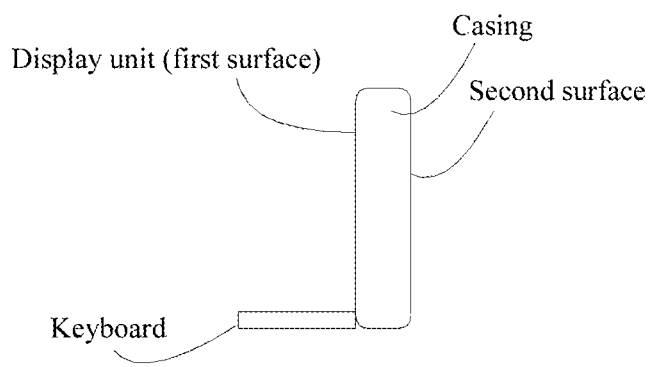

The electronic device according to the embodiments of the present invention, after the keyboard slides out of the groove, can form a laptop operating mode as shown in FIG. 9; when the keyboard is not used any anymore, it shall slide back to the groove.

The electronic device according to the embodiments of the present invention can provide the laptop operating mode and the tablet operating mode for the user, and can accommodate the keyboard in the groove on the second surface of the casing, to facilitate the user carrying the keyboard. Moreover, it can control the on and off states of the keyboard and charge the keyboard according to the slide-out amount of the keyboard, when the user is not using the keyboard, the operating function of the keyboard is disabled to save power of the electronic device.

Figure 10:
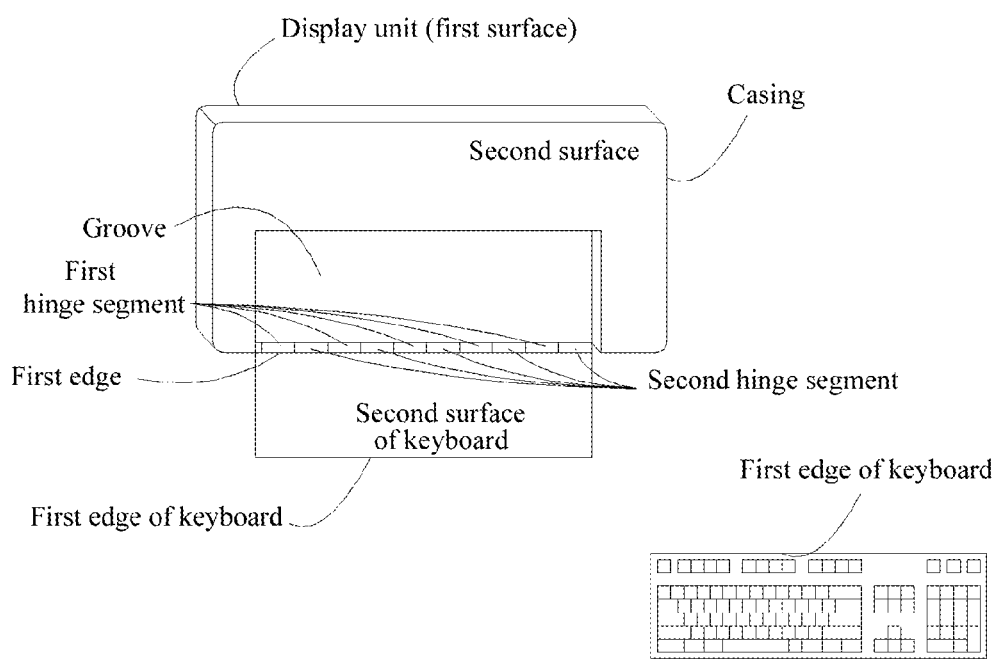
FIG. 10 shows a tenth type of electronic device given in the embodiments of the present invention.

Furthermore, as a further expansion of the electronic device as shown in FIG. 1, an electronic device as shown in FIG. 10 is provided in the embodiments of the present invention. On the second surface of the electronic device, a groove for accommodating the keyboard is disposed. The first edge of the groove overlaps the first edge of the casing, and there is a first hinge segment for connecting the keyboard on the first edge of the groove. On a corresponding position of the first edge of the keyboard, there is a second hinge segment for connecting the casing. The first hinge segment and the second hinge segment interlace to form a hinge for connecting the casing to the keyboard.

Referring to FIG. 11(a), the keyboard can rotate around the hinge and is accommodated in the groove; when the keyboard is accommodated in the groove, the first surface of the keyboard faces the groove. Referring to FIG. 11(b), when the keyboard rotates around the hinge to form a 180° angle with the groove, the electronic device presents the tablet operating mode; referring to FIG. 11(c), when the keyboard rotates around the hinge to form a 240° angle with the groove, the electronic device presents the laptop operating mode.

In addition, a strand wire for connecting the casing to the keyboard is embedded in the hinge; the keyboard sends data to the casing through the strand wire, and the casing controls the on and off states of the keyboard and charges the keyboard through the strand wire.

Figure 12:
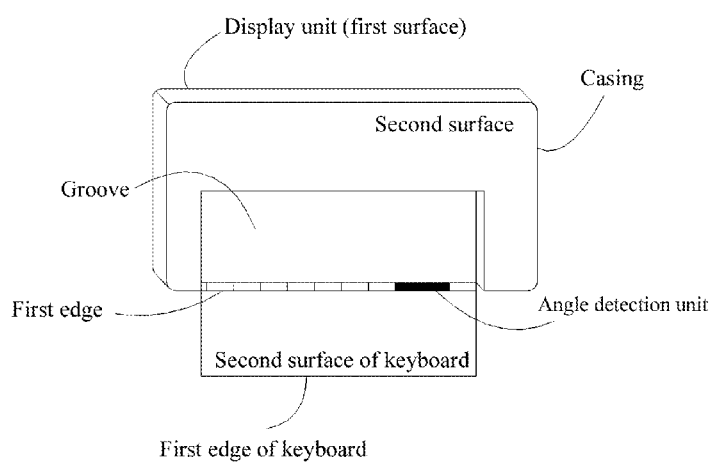
FIG. 12 shows a twelfth type of electronic device given in the embodiments of the present invention.

Further, referring to FIG. 12, the hinge has an angle detection unit for detecting an included angle value between the first hinge segment and the second hinge segment, and the included angle value detected is sent to the casing through the strand wire, so that the casing controls the on and off states of the keyboard and charges the keyboard.

The electronic device according to the embodiments of the present invention can provide the tablet operating mode and the laptop operating mode for the user. When the user is no longer using the keyboard, the keyboard connected to the casing via a hinge is accommodated in the groove on the back of the casing, easy for the user to carry it. And the on and off states of the keyboard can be controlled and charge the keyboard in accordance with the included angle value detected by the angle detection unit; when the user is not using the keyboard, the operating function of the keyboard is disabled to save power of the electronic device.

Figure 13:
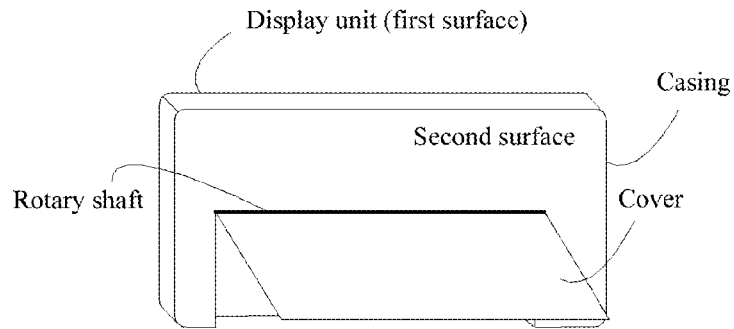
FIG. 13 shows a thirteenth type of electronic device given in the embodiments of the present invention.

Further, as an expansion to the electronic device as shown in any one of FIGS. 1 to 12, an electronic device as shown in FIG. 13 is provided in the embodiments of the present invention, the electronic device further comprising a cover connected to the casing.

Figure 14:
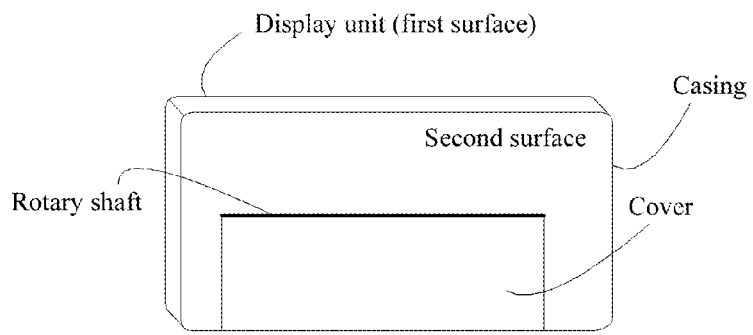
FIG. 14 shows a fourteenth type of electronic device given in the embodiments of the present invention.
Figure 14:
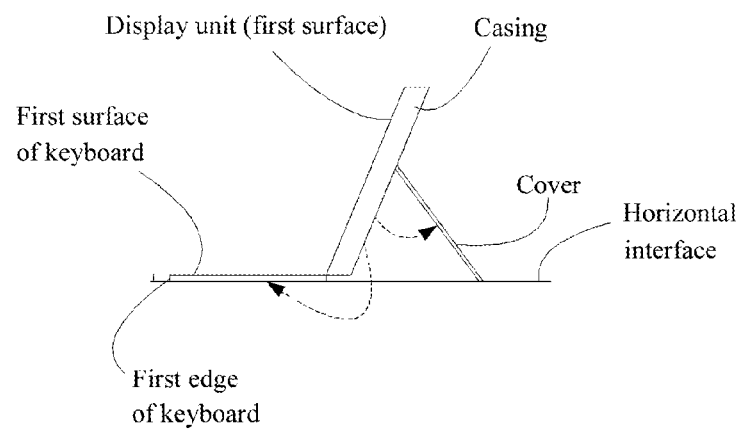

The cover is connected to the casing via a rotary shaft, and a size of the cover is adapted to the size of the groove, so as to cover the groove. When the cover covers the groove, the electronic device presents the tablet operating mode; when the electronic device presents the laptop operating mode, the cover opens at a predetermined angle with respect to the casing, to support the casing to be placed on a horizontal interface, i.e., as shown in FIG. 14.

Further, the rotary shaft is made of material having a predetermined friction coefficient, which ensures that when the cover and the casing have an included angle of 15° and are on the horizontal interface, the cover can support the weight of the casing or a sum of weights of the casing and the input unit.

Figure 15:
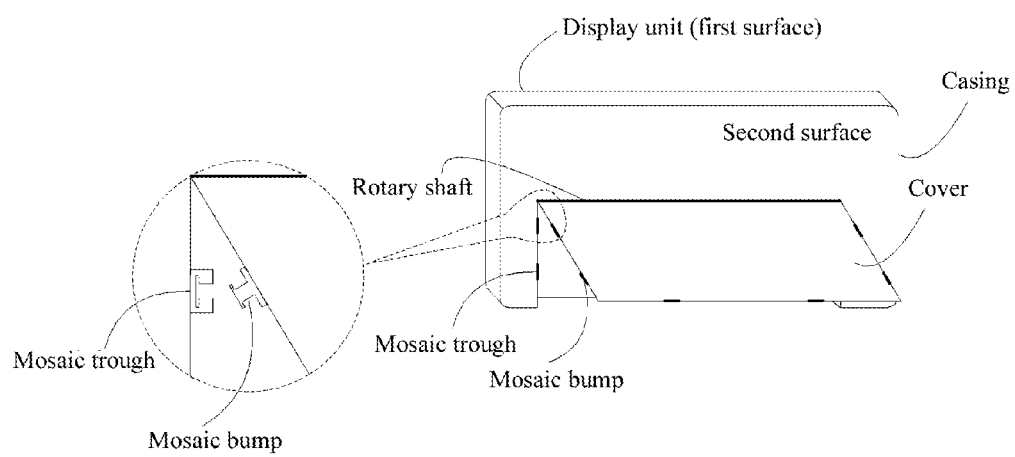
FIG. 15 shows a fifteenth type of electronic device given in the embodiments of the present invention.

Further, in addition to the edge overlapping the rotary shaft, the other three edges of the cover may have mosaic bumps on predetermined positions. For example, referring to FIG. 15, each of the three edges of the cover has a mosaic bump disposed at its one-third position respectively. On the other three edges of the cover except the one overlapping the rotary shaft, there set the same number of mosaic troughs as the mosaic bumps on positions corresponding to the mosaic bumps, the mosaic bumps and the mosaic troughs are used to fix the cover to the casing when the cover covers the groove.

Figure 16:
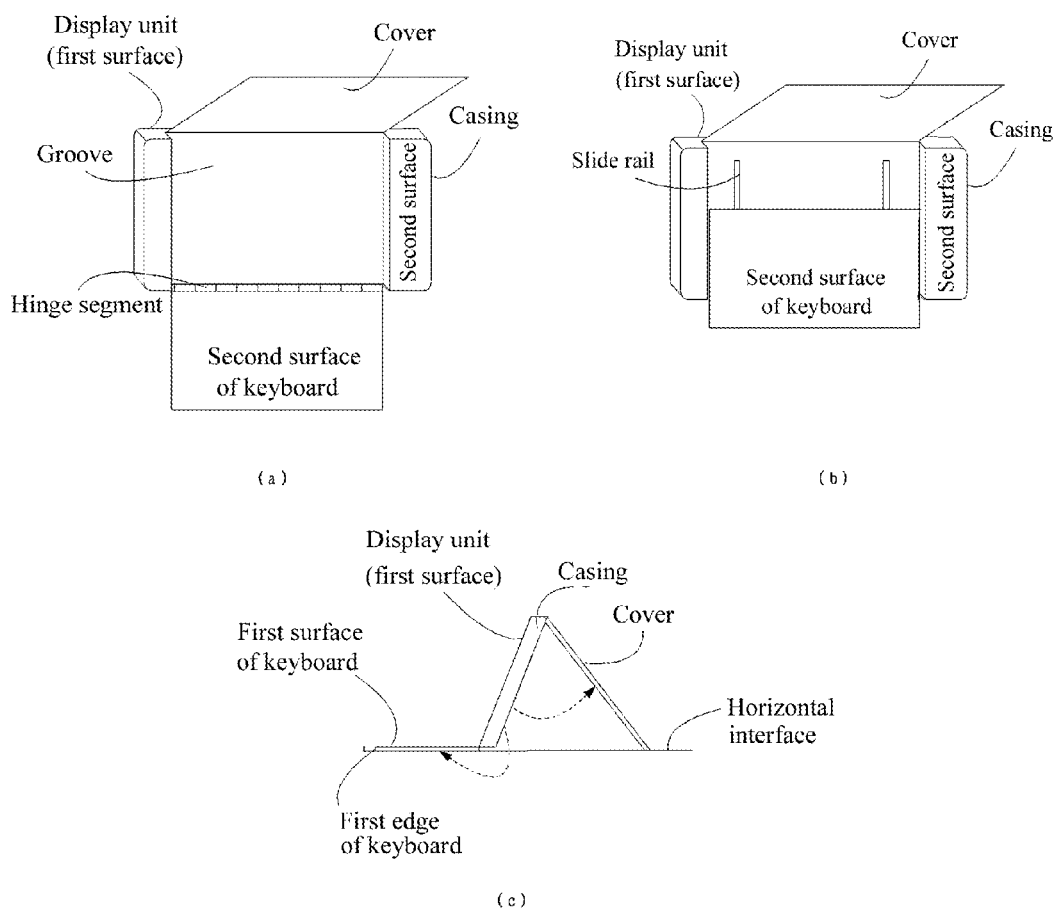
FIG. 16 shows a sixteenth type of electronic device given in the embodiments of the present invention.

Further, in the embodiments of the present invention, the position of the rotary shaft is not limited to that shown in FIG. 13, and in practical application, the rotary shaft can be set at any position parallel to the first edge of the casing. Referring to FIGS. 16(a) and 16(b), the rotary shaft can also overlap the second edge (i.e., the upper edge) of the casing in the two connection manners of slide rail and hinge, that is, the groove is through the casing. When the electronic device presents a laptop mode, the electronic device is placed on a horizontal interface as shown in FIG. 16(c).

Figure 17:
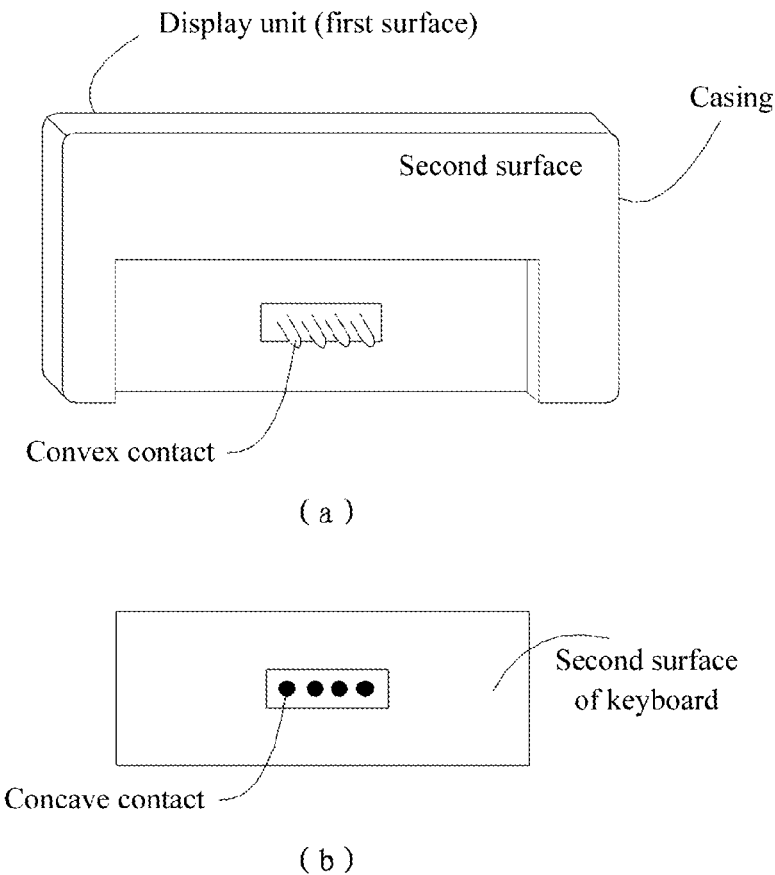
FIG. 17 shows a seventeenth type of electronic device given in the embodiments of the present invention.

Further, referring to FIG. 17(a), a convex contact is provided on a predetermined position inside the groove, in order to charge the keyboard. Referring to FIG. 17(b), a concave contact is provided in a position corresponding to the convex contact on the second surface of the keyboard, the concave contact being fit for the convex contact so that the casing charges the keyboard.

For an electronic device whose keyboard is connected to the casing via a slide rail or hinge, the casing can charge the keyboard through a strand wire embedded in the hinge, and for a wireless keyboard, after the keyboard is accommodated in the groove, the concave contact fits for the convex contact, and the casing can charge the keyboard through the concave contact.

The electronic device according to the embodiments of the present invention can provide a tablet operating mode and a laptop operating mode for a user. When the user adopts the laptop operating mode, the cover disposed on the back of the casing can support the electronic device, when the user is no longer using the keyboard, the cover may cover the groove and the keyboard accommodated in the groove. In addition, for the electronic device provided in the embodiments of the present invention, a convex contact for charging is set inside the groove to charge the wireless keyboard accommodated in the groove.

Figure 18:
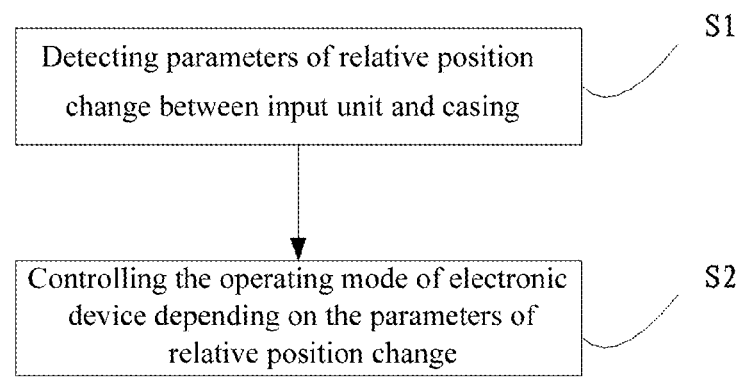
FIG. 18 is a flowchart of a method for switching state according to the embodiments of the present invention.

The embodiment of the present invention provides a method for switching state, the method being applied to the electronic device according to any one of FIGS. 1 to 17, referring to FIG. 18, the method comprises the following steps:

S1: detecting parameters of relative position change between the input unit and the casing.

Wherein, the casing includes a display unit for displaying on a first surface thereof, and includes a processing unit and a storage unit inside it. The input unit can be a wireless keyboard or a wired keyboard, and can be a physical keyboard or a touch-screen keyboard; the embodiments of the present invention are described by taking the physical keyboard as an example. The keyboard can move relative to the casing to change its position.

S2: controlling an operating mode of the electronic device depending on the parameters of relative position change.

The electronic device has at least two different operating modes: a tablet operating mode or a laptop operating mode.

Figure 3:
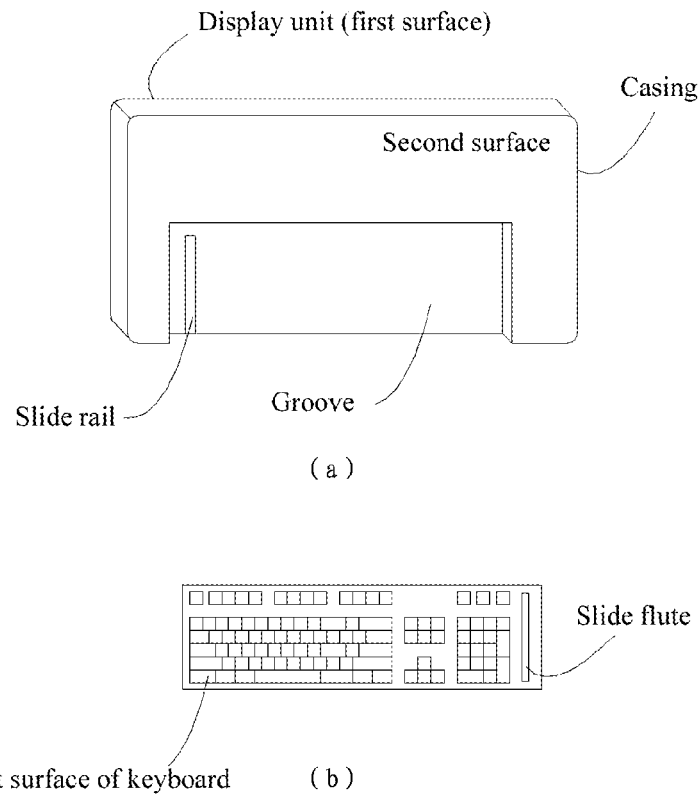
FIG. 3 shows a third type of electronic device given in the embodiments of the present invention.
Figure 4:
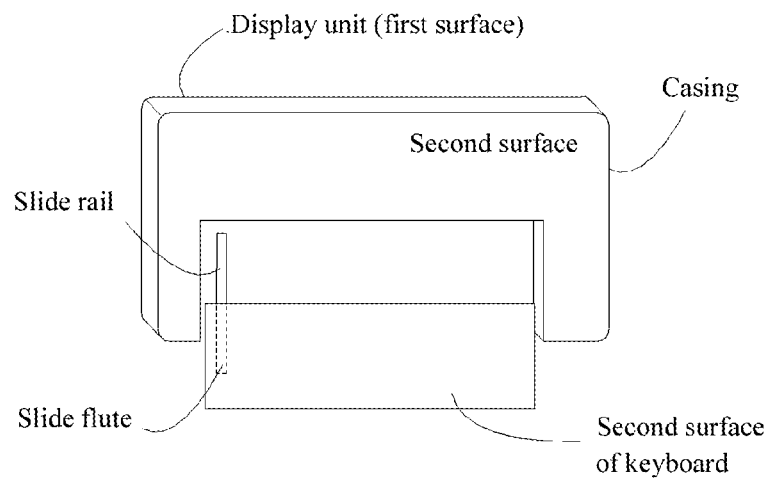
FIG. 4 shows a fourth type of electronic device given in the embodiments of the present invention.
Figure 5:
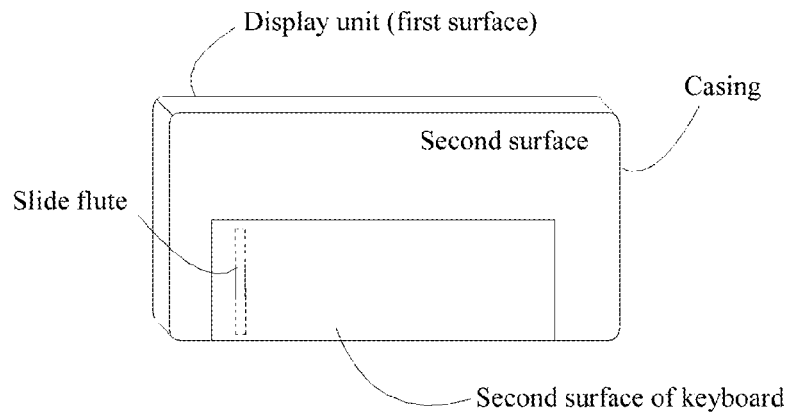
FIG. 5 shows a fifth type of electronic device given in the embodiments of the present invention.

Hereinafter the steps S1 and S2 are described according to the different connection relationships between the keyboard and the casing, respectively:

A) For a slide rail type electronic device as shown in any one of FIGS. 3 to 9, taking FIG. 3(a) as an example: the slide rail detects a slide-out amount of the keyboard, which is a length that the keyboard is exposed from the groove under the current state, i.e., a length that the keyboard slides out of the groove. The specific detection methods include but not limited to, detecting by infrared the length of slide flute portion not exposed from the groove, and then obtaining the length of the slide flute portion exposed from the groove based on the total length of the slide flute, i.e., obtaining the slide-out amount of the keyboard.

When determining whether the slide-out amount is greater than a predetermined threshold value, if the slide-out amount is greater than or equal to the predetermined threshold value, the function of data exchange between the keyboard and the casing is initiated, if the slide-out amount is less than the predetermined threshold value, the function of data exchange between the keyboard and the casing is closed. After the function of data exchange between the keyboard and the casing is initiated, the keyboard is started, and can send data information inputted by a user to the casing. The predetermined threshold value can be set to two-thirds of the total length of the slide flute, when the keyboard slides out of the groove by its two-thirds, the electronic device determines that the user need to use the keyboard, and then enables the operating function of the keyboard. In practical application, a device manufacturer may set a predetermined threshold value, and the embodiments of the present invention make no limit to the predetermined threshold value specifically.

Further, it is feasible to start or stop charging the keyboard according to the slide-out amount. Specifically, if the detected slide-out amount is less than the predetermined threshold value, the charging of the keyboard is started, if the detected slide-out amount is greater than or equal to the predetermined threshold value, the charging of the keyboard is stopped. When the slide-out amount is less than the predetermined value, the electronic device determines that the user does not need to use the keyboard, and then starts to charge the keyboard.

Figure 11:
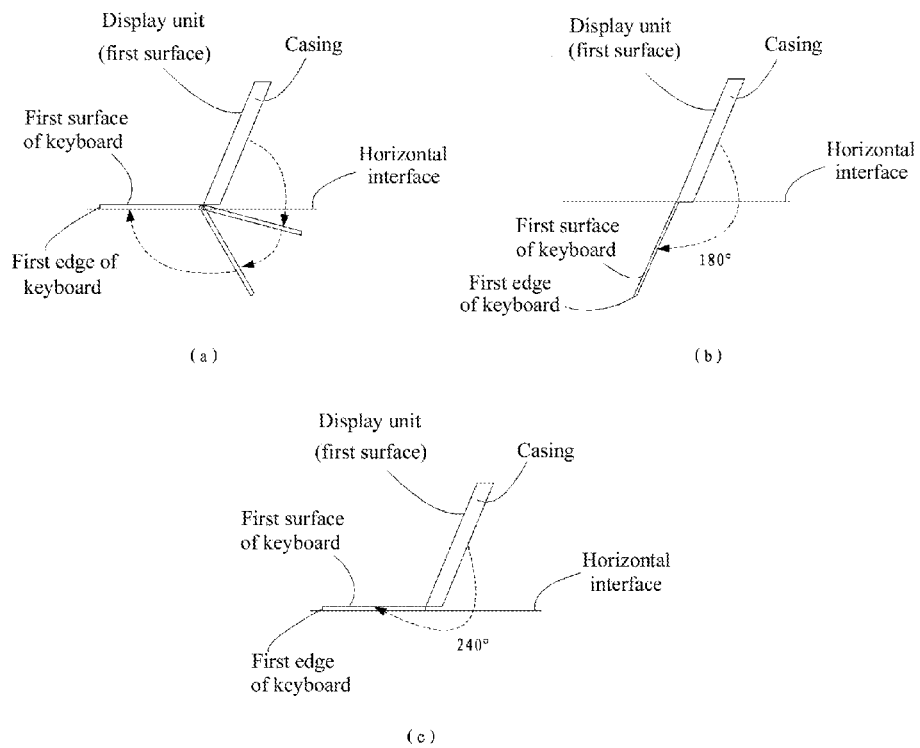
FIG. 11 shows an eleventh type of electronic device given in the embodiments of the present invention.

B) For a hinge type electronic device as shown in any one of FIGS. 10 to 12, taking FIG. 10 as an example: the hinge has an angle detection unit for detecting an included angle between the first hinge segment and the second hinge segment. As the first hinge segment and the second hinge segment are fixed with respect to the casing and the keyboard respectively, the angle detection unit can obtain an included angle between the casing and the keyboard according to the included angle between the first hinge segment and the second hinge segment.

It is to be noted that the aforesaid included angle is the angle between the keyboard and the second surface of the casing, with a value less than 360°. In practical application, the angle detection unit includes but not limited to, an angle sensor, and the embodiments of the present invention make no further limitation thereto.

When determining whether the included angle is greater than a predetermined threshold value, if the included angle is greater than or equal to the predetermined threshold value, the function of data exchange between the keyboard and the casing is initiated, if the included angle is less than the predetermined threshold value, the function of data exchange between the keyboard and the casing is disabled. After the function of data exchange between the keyboard and the casing is initiated, the keyboard is initiated, and can send data information inputted by a user to the casing. The predetermined threshold value can be set to 240°, when the angle reaches 240°, the electronic device determines that the user needs to use the keyboard, and then enables the operating function of the keyboard. In practical application, a device manufacturer may set the predetermined threshold value, and the embodiments of the present invention make no limit to the predetermined threshold value specifically.

Further, it is feasible to start or stop charging the keyboard according to the included angle. Specifically, if the detected included angle is less than the predetermined threshold value, the charging of the keyboard is started, if the detected included angle is greater than or equal to the predetermined threshold value, the charging of the keyboard is stopped. When the included angle is less than the predetermined value, the electronic device determines that the user does not need to use the keyboard, and then starts to charge the keyboard.

In an application scene according to the embodiments of the present invention, when the keyboard of the slide rail type electronic device slides out of the slide flute by two-thirds of the length of the slide flute, the electronic device enables the tablet operating mode, starts the keyboard and stop charging the keyboard. When the keyboard of the hinge type electronic device rotates by 180° relative to the casing, the electronic device enables the tablet operating mode, starts the keyboard and stop charging the keyboard. When the keyboard of the hinge type electronic device rotates by 240° relative to the casing, the electronic device enables the laptop operating mode, maintains the function of data exchange between the keyboard and the casing and does not charge the keyboard.

The method for switching state according to the embodiments of the present application can acquire the operating state of the electronic device based on the positional relationship between the keyboard and the casing, start or close the keyboard and control the charging of the keyboard depending on the operating state of the electronic device. It shall save power consumption of the keyboard when the user is not using the keyboard. For a wireless keyboard, it may also avoid inconvenience for the user caused by manual replacement of batteries in the keyboard.

The electronic devices described in the embodiments of the present invention include but not limited to a cell phone and a tablet.

One person skilled in the art can easily understand that as described for convenience and simplicity, examples are explained only based on the above division of functional modules, in practice, the above functions can be assigned to be implemented by different functional modules according to practical needs, that is, the internal structure of the device is divided into different functional modules to complete all or part of the functions described above. For the specific work processes of the system, device and unit described above, one can refer to the corresponding processes in the aforementioned method embodiments, and no more descriptions will be given here.

In the several embodiments given in the present application, it shall be appreciated that the disclosed system, device and method can be implemented in other manners. For example, the afore-described apparatus embodiments are given by way of illustration only, e.g., the division of the modules or units is only a logic functional division, and may be conducted in other dividing manners in practical implementation,for example, a plurality of units or components can combine or be integrated into another system, or some of the features may be omitted or not performed. Another point is that the mutual coupling or direct coupling or communication connection displayed or discussed may be implemented via a number of interfaces, the indirect coupling or communication connection between means or units may be electrical, mechanical or in any other forms.

The units described as a separate part may be or may not be physically separated, a composite part displayed as a unit may be or may not be a physical unit, namely, it may be located in one place, or can be distributed to a plurality of network units. According to practical needs, part or all of the units can be selected to achieve the objective of the solution of the present embodiments.

Moreover, the individual functional units in various embodiments of the present invention can be integrated into one processing unit, or each unit may exist physically and separately, or two or more units may be integrated into one unit. The above integrated unit can be implemented in the form of both hardware and software functional units.

If the integrated unit is implemented in the form of software functional unit as an independent product to be sold or used, it can be stored in a computer-readable storage medium. Based on such understanding, the technical solution of the present invention in essence, or its content contributing to the prior art, or all or part of the technical solution may be embodied in the form of software products, and the computer software product is stored in a storage medium, including several instructions to enable a computer device (it may be a personal computer, a server, or a network device etc.) or a processor to execute all or part of the steps of the method described in respective embodiments of the present invention. The aforesaid storage medium includes: U disk, portable hard disk, Read-Only Memory (ROM), Random Access Memory (RAM), magnetic disk or CD-ROM, and other medium capable of storing program codes.

What are described above are only specific embodiments of the present invention, and the protection scope of the present invention is not limited thereto. One skilled in the art can easily conceives various changes or replacements within the technical scope of the disclosure of the present invention, which shall be covered by the scope of the present invention. Therefore, the protection scope of the present invention should be defined by the scope of the following claims.

The invention claimed is:
1. An electronic device, comprising:
a casing, including a display unit for displaying on a first surface of the casing;
an input unit the input unit being movably disposed on a second surface of the casing;
a groove disposed on the second surface of the casing for accommodating the input unit;
a cover connected to the casing via a rotary shaft, the cover having a size adapted to the groove so as to cover the grove;
wherein, according to different positional relationships between the input unit and the casing, the electronic device has at least two different operating modes: a tablet operating mode or a laptop operating mode;
wherein a mosaic bump is set in a predetermined position on an edge of the cover; a mosaic trough fit for the mosaic bump is set in a position corresponding to the mosaic bump on an edge of the groove so that when the cover covers the groove, the mosaic bump and the mosaic trough are used to fix the cover to the second surface of the casing.

2. The electronic device according to claim 1, further comprising:
wherein there is at least one slide rail inside the groove, the casing and the input unit are connected via the at least one slide rail, and the input unit is capable of sliding relative to the casing in parallel via the at least one slide rail.

3. The electronic device according to claim 2,
wherein, when the cover covers the groove, the electronic device presents a tablet shape;

when the cover opens at a predetermined angle with respect to the casing, the cover supports the casing to be placed on a horizontal interface.

4. The electronic device according to claim 3, wherein the rotary shaft is made of material having a predetermined friction coefficient, the predetermined friction coefficient ensures that the cover supports the weight of the casing or a sum of weights of the casing and the input unit when the cover and the casing have an included angle of 15 degree and are on the horizontal interface.

5. The electronic device according to claim 3, wherein a convex contact for charging the input unit is provided in a predetermined position inside the groove, and a concave contact for connecting the convex contact is provided in a position corresponding to the convex contact on the input unit.

6. The electronic device according to claim 1, wherein a first edge of the groove overlaps a first edge of the casing, and has thereon a first hinge segment for connecting the input unit;
   in a position corresponding to the first edge of the groove on the input unit, there is a second hinge segment for connecting the casing, the first hinge segment and the second hinge segment being interlaced with each other.

7. The electronic device according to claim 6, wherein the casing and the input unit are connected through a strand wire for at least one of data exchange and charging, the strand wire being embedded in a hinge composed of the first hinge segment and the second hinge segment interlaced with each other.

8. The electronic device according to claim 4, wherein the hinge has an angle detection unit for detecting an included angle between the first hinge segment and the second hinge segment.

9. The electronic device according to claim 8, further comprising:
   a cover, connected to the casing via a rotary shaft, the size of the cover being adapted to the size of the groove so as to cover the groove;
   wherein, when the cover covers the groove, the electronic device presents a tablet shape;
   when the cover opens at a predetermined angle with respect to the casing, the cover supports the casing to be placed on a horizontal interface.

10. The electronic device according to claim 4, further comprising:
    a cover, connected to the casing via a rotary shaft, the size of the cover being adapted to the size of the groove so as to cover the groove;
    wherein, when the cover covers the groove, the electronic device presents a tablet shape;
    when the cover opens at a predetermined angle with respect to the casing, the cover supports the casing to be placed on a horizontal interface.

11. The electronic device according to claim 6, further comprising:
    a cover, connected to the casing via a rotary shaft, the size of the cover being adapted to the size of the groove so as to cover the groove;
    wherein, when the cover covers the groove, the electronic device presents a tablet shape;
    when the cover opens at a predetermined angle with respect to the casing, the cover supports the casing to be placed on a horizontal interface.

12. The electronic device according to claim 11, wherein the rotary shaft is made of material having a predetermined friction coefficient, the predetermined friction coefficient ensures that the cover supports the weight of the casing or a sum of weights of the casing and the input unit when the cover and the casing have an included angle of 15 degree and are on the horizontal interface.

13. The electronic device according to claim 11, wherein a convex contact for charging the input unit is provided in a predetermined position inside the groove, and a concave contact for connecting the convex contact is provided in a position corresponding to the convex contact on the input unit.

14. A method for switching state, applied to an electronic device which at least includes a casing, an input unit, a groove disposed on the second surface of the casing and a cover connected to the casing via a rotary shaft, the groove being for accommodating the input unit, the cover having a size adapted to the groove so as to cover the groove,
    wherein a mosaic bump is set in a predetermined position on an edge of the cover; a mosaic trough fit for the mosaic bump is set in a position corresponding to the mosaic bump on an edge of the groove so that when the cover covers the groove, the mosaic bump and the mosaic trough are used to fix the cover to the second surface of the casing, the electronic device is capable of receiving data content received by the input unit, the method comprising:
    detecting parameters of relative position change between the input unit and the casing, wherein the input unit is capable of moving relative to the casing to change its position;
    controlling an operating mode of the electronic device depending on the parameters of relative position change;
    the electronic device has at least two different operating modes: a tablet operating mode and a laptop operating mode.

15. The method according to claim 14, wherein the detecting parameters of relative position change between the input unit and the casing comprises:
    when the input unit and the casing are connected via a hinge, detecting an included angle between the input unit and the casing;
    when the input unit and the casing are connected via a slide rail, detecting a slide-out amount of the input unit, the slide-out amount being a length that the input unit slides out of the groove, wherein the groove is disposed on a second surface of the casing so as to accommodate the input unit.

16. The method according to claim 15, wherein the controlling the operating mode of the electronic device depending on the parameters of relative position change comprises:
    when the included angle is greater than or equal to a predetermined angle value, performing at least one of initiating the function of data exchange between the input unit and the casing and stopping charging the input unit;
    when the included angle is less than the predetermined angle value, performing at least one of closing the function of data exchange between the input unit and the casing and charging the input unit.

17. The method according to claim 16, wherein the included angle is 240 degree.

18. The method according to claim 15, wherein the included angle is 240 degree.

19. The method according to claim 15, wherein the controlling the operating mode of the electronic device depending on the parameters of relative position change comprises:
    when the slide-out amount is greater than or equal to a predetermined threshold value, performing at least one of initiating the function of data exchange between the input unit and the casing and stopping charging the input unit;

when the slide-out amount is less than the predetermined threshold value, performing at least one of closing the function of data exchange between the input unit and the casing and charging the input unit.

* * * * *